US012346480B2

(12) United States Patent
Riise et al.

(10) Patent No.: US 12,346,480 B2
(45) Date of Patent: Jul. 1, 2025

(54) USE OF OBFUSCATION MARKER TO OBFUSCATE A FACE IMAGE AND ENABLE COMPUTERIZED FACE IDENTIFICATION

(71) Applicant: Roku, Inc., San Jose, CA (US)

(72) Inventors: Soren Riise, San Jose, CA (US); Sunil Ramesh, Cupertino, CA (US); Michael Cutter, Golden, CO (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 172 days.

(21) Appl. No.: 18/167,307

(22) Filed: Feb. 10, 2023

(65) Prior Publication Data

US 2024/0273236 A1 Aug. 15, 2024

(51) Int. Cl.
*G06F 21/62* (2013.01)
*G06F 21/32* (2013.01)
*G06V 40/16* (2022.01)

(52) U.S. Cl.
CPC .......... *G06F 21/6254* (2013.01); *G06F 21/32* (2013.01); *G06F 21/6245* (2013.01); *G06V 40/172* (2022.01); *G06F 2221/2141* (2013.01)

(58) Field of Classification Search
CPC .. G06F 21/6254; G06F 21/32; G06F 21/6245; G06F 2221/2141; G06V 40/172
See application file for complete search history.

(56) References Cited

U.S. PATENT DOCUMENTS

2018/0139203 A1\* 5/2018 Dolan ................... G06V 20/20
2018/0331833 A1\* 11/2018 Tomlinson ............ H04L 9/3242
2022/0335112 A1\* 10/2022 Gropper ................ G16H 10/60

OTHER PUBLICATIONS

Chunlei Peng, et al., "Anonym-Recognizer: Relationship-preserving Face Anonymization and Recognition," Proceedings of the 1st Workshop on User-Centric Narrative Summarization of Long Videos, ACMPUB27, New York, NY, Oct. 10, 2022, pp. 1-6.
Lin Yuan, et al., "PRO-Face: A Generic Framework for Privacy-preserving Recognizable Obfuscation of Face Images," Proceedings of the Genetic and Evolutionary Computation Conference, ACMPUB27, New York, NY, Oct. 10, 2022, pp. 1661-1669.

(Continued)

*Primary Examiner* — Cheng-Feng Huang
(74) *Attorney, Agent, or Firm* — McDonnell Boehnen Hulbert & Berghoff LLP

(57) ABSTRACT

A method and system for use of obfuscation coding. An example method includes a computing system receiving an image that depicts a human face. The method then includes the computing system generating a modified image based on the received image, with the generating of the modified image involving inserting into the received image an obfuscation marker that (i) obfuscates the human face in a manner that prevents a person observing the modified image from identifying the human face and (ii) includes predefined symbology that is interpretable by a machine to identify the obfuscated human face. Further, the method includes using the predefined symbology in the modified image as a basis to take action based on an identity of the human face.

20 Claims, 10 Drawing Sheets

(56) References Cited

OTHER PUBLICATIONS

Martin Blazevic, et al., "Towards Reversible De-Identification in Video Sequences Using 3D Avatars and Steganography," Proceedings of the Croatian Computer Vision Workshop, Year 3, Sep. 22, 2015, pp. 9-14.
G. A. Kukharev et al., Barcoding Technologies for the Tasks of the Facial Biometrics: State of the Art and New Solutions, Pattern Recognition and Image Analysis, vol. 28, No. 3, pp. 496-509, Jan. 11, 2018.

* cited by examiner

USE OF OBFUSCATION MARKER TO OBFUSCATE A FACE IMAGE AND ENABLE COMPUTERIZED FACE IDENTIFICATION

SUMMARY

There may be many scenarios where it would be useful to capture and analyze images (e.g., still images and/or video frames) depicting faces of people. Without limitation, for instance, it may be useful to capture and analyze such images in order to identify one or more depicted people as a basis for taking user-specific action, such as providing authorized access to a secure system (e.g., a house, a car, a computer, a phone, a bank account, etc.) or engaging in user-specific control of devices or systems (e.g., lighting, audio, heating and air conditioning, etc.), among other possibilities.

In an example implementation, a computing system may be provisioned with reference images depicting various people's faces. The computing system may then receive a newly captured query image depicting a person's face, and based on an analysis of the query image and the reference images, may determine that the face depicted by the query image matches a face depicted by a reference image. Based on finding this match, the computing system may then responsively carry out an associated action such as one of those noted above.

One way that the computing system could determine that a face depicted by a query image matches a face depicted by a reference image is to convert each face depiction into a corresponding data representation of the depicted face, such as a unique vector of facial features (e.g., a unique digital face fingerprint), and to then compare the data representations of the faces to determine if they match each other with a sufficient degree of certainty. Optimally, the data representation of each such face should match the face in a way that is robust to the pose of the face, lighting conditions, field of the camera or other sensor that captured the image, facial hair, accessories, etc.

The computing system could use any of a variety of well-known algorithms to so vectorize each face depiction. Such an algorithm would optimally be deterministic, such that the algorithm would produce the same (or at least largely the same, sufficiently matching) face vector based on analysis of each of various depictions of the same person's face.

Given reference images depicting faces, the computing system could thus generate a reference face vector respectively representing each depicted face. Further, given a newly received query image depicting a face, the computing system could generate a query face vector representing the depicted face. The computing system could then compare the query face vector with the various reference face vectors and thereby determine that the query face vector matches a particular reference face vector, and thus effectively that the face represented by the query face vector matches the face represented by the particular reference face vector. Based on this effective matching of faces, the computing system could then carry out an action such as one of those noted above. Further, if the computing system does not find a match with a sufficient degree of certainty, such based on use of one or more dissimilarity metrics, the computing system may enroll the query face vector as a new reference face vector.

One technical problem that may arise in relation to this process, however, is that the process may involve storing images that depict people's faces, and, without adequate security, those stored images may get into the wrong hands and be used for undesirable purposes.

For instance, in order for the computing system to generate face vectors to facilitate the above matching process, the computing system may need to receive or otherwise have access in the first place to the raw reference and query images that depict people's faces. If a bad actor gets ahold of those raw images, the bad actor may therefore gain access to depictions of the people's faces and may use those face depictions for undesired purposes, such as for tracking the people or publishing the images without authorization, among other possibilities.

Disclosed is a process that may help to reduce an extent to which images that depict faces could fall into the wrong hands and/or be used for undesired purposes, while still effectively allowing computerized face matching or other action based on depicted faces.

In accordance with the disclosure, given an image that depicts a human face, a computing system could generate a modified version of the image, by inserting into the image an obfuscation marker that (i) obfuscates the human face in a manner that would prevent a person observing the modified image from identifying the human face and (ii) includes predefined symbology that is interpretable by a machine to identify the obfuscated human face. Further, the computing system could then store the modified image possibly instead of storing the original image, so that a person who gets ahold of the modified image would not be able to determine the identity of the face from simply observing the modified image.

Optimally, the obfuscation marker so inserted into the image could enable the computing system or another computing system to take action based on an identity of the human face. For instance, given the modified image, a computing system could engage in machine-reading of the obfuscation marker, such as with pattern matching or other analysis, to extract or decode from or based on the obfuscation marker an identity of the obfuscated human face. The computing system could then use that determined identity as a basis to take action, such as to grant access to a secure system or the like.

In this or another respect, given an image that depicts a face, a computing system could modify the image in a manner that obfuscates the face depiction while inserting into the image a graphical object that is directly correlated with the face such as with an associated face vector, so that the graphical object can be used as a basis for effectively conducting face matching.

An example of this process could involve generating a graphical object that correlates with the face depiction and inserting the generated graphical object into the image as an overlay and/or replacement of the face depiction. Another example of this process could involve blurring the face depiction beyond recognition and generating and inserting into the image at or near the obfuscated face depiction a graphical object that correlates with the face, and/or configuring pixels of the blurred face depiction to define a graphical object as a watermark that correlates with the face depiction. Numerous other examples could be possible as well.

The act of generating a graphical object that correlates with the face depiction could involve applying a known vectorization algorithm as described above and generating a graphical object that encodes or otherwise embodies the resulting face vector. This algorithm may be a one-way function keyed to features of the face depiction, so the computing system may derive a face vector and associated graphical object based on features of the face depiction and could insert the graphical object into the image without a risk that the graphical object could be translated back into the underlying face depiction. Alternatively, another implementation may involve use of a two-way function.

Further, other forms of graphical objects could be used. For instance, a depiction of a human face could be replaced with an animal face, a code number, or other object that correlates with the human face. Other examples could be possible as well.

In addition, the act of obfuscating the face depiction while inserting the graphical object that correlates with the face depiction could involve editing the image by superimposing the graphical object over the depicted face sufficiently to obfuscate the face, replacing pixels that define at least a portion of the face image with pixels that define the graphical object, transforming the face image into the graphical object, or otherwise rendering the face depiction unrecognizable while inserting the graphical object in the image in proximity to or otherwise in association with a position in the image of the face. Obfuscating the face image could involve rendering the face image visually unidentifiable and/or making the face image obscure, unclear, or unintelligible, so that if a person were to look at the image, the person would be unable to identify the face.

Further, the graphical object that the computing system inserts into the image to obfuscate the face depiction and/or in association with the obfuscated face image could be a single, unitary graphical object or could comprise multiple noncontiguous graphical components, perhaps a cloud of pixels and/or various other object fragments, among other possibilities.

Without limitation, an example of a graphical object that the computing system could generate based on a face depicted by an image is a bar-code object, such as a Quick-Response (QR) code or other matrix or two-dimensional bar code image. For instance, the computing system could apply a vectorization process as mentioned above to establish a face vector based on features of the depicted face, and the computing system could then generate a QR code (i.e., a QR code image) that represents, maps to, and/or is otherwise based on that face vector and/or associated data. The computing system could then insert that generated QR code into the image in a manner that obfuscates the depicted face or is positioned in the image in correlation with the obfuscated face. That way, if a person or system were to gain access to the image, the person or system may see or detect at best the QR code rather than the underlying face.

Such a QR code or other graphical object could encode a feature vector representing a face, or it could point to a globally unique ID to facilitate querying a database to obtain identification information, assuming proper clearance for instance. A QR code or other graphical object could also be, represent, or point to a unique extraction-ID for the image overall, and a vector respectively representing each of one or more faces in the image could be stored separately, which may have the added benefit of the same person not being represented by the same QR code across multiple images. This may offer privacy benefits, as it could prevent two images of the same person from being easily correlated with each other without knowledge of what information was extracted. Further, such a QR code could be beneficially generated without a need to identify the person or face at the time of feature extraction and QR-code generation. Other arrangements could be possible as well.

The computing system could perform this obfuscation and graphical object insertion programmatically as to multiple reference images depicting faces and further as to a given query image depicting a face, so as to help minimize storage of images that depict actual faces.

For instance, when the computing system is initially provisioned with reference images depicting faces, the computing system may edit those images by obfuscating the faces with QR codes or other graphical objects that correlate with the faces and/or by otherwise obfuscating the faces and inserting such correlated graphical objects in positional association with the obfuscated faces, and the computing system may store the edited reference images rather than the reference images depicting the faces. Further, when the computing system receives a query image depicting a face, the computing system may likewise edit that image by obfuscating the face with a QR codes or other graphical object that correlates with the face and/or by otherwise obfuscating the face and inserting such a correlated graphical object in positional association with the obfuscated face, and the computing system may store the edited query image rather than the query image depicting the face. (The computing system may also store the unedited images depicting the faces, perhaps in secure backup storage for troubleshooting or other uses.)

To determine that the face that was depicted by a query image matches a face that was depicted by a given reference image, the computing system may then compare the QR codes or other inserted graphical objects to find a sufficient match. For instance, the computing system may determine whether that the QR code or other graphical object depicted by the query image (i.e., the edited query image) matches the QR code or other graphical object depicted by a given reference image (i.e., a given edited reference image) to a sufficient degree of certainty, thereby effectively establishing that the face that was depicted by the query image matches the face that was depicted by the given reference image. Based on that matching, the computing system may then take an action, such as one of those noted above for instance.

This comparison of graphical objects may involve pattern matching and/or may take other forms. As to QR codes in particular, the comparison may involve scanning of QR codes to determine represented code data and comparing the represented code data. Other implementations may be possible as well.

In an example implementation, a computing system in this process may be distributed. For instance, a portion of the computing system may be a local portion, provided at a first location such as a home or a mobile computing device, among other possibilities, and another portion of the computing system may be a cloud-based portion, provided at a second location such as a network server platform, among other possibilities.

With this arrangement, a camera at or associated with the first location may capture images of people's faces, and the local portion of the computing system may transmit the captured images to the cloud-based portion of the computing system for storage and analysis. Further, with this arrangement, the local portion of the computing system may perform the face obfuscation and graphical object insertion described above before transmitting the images to the cloud-based portion of the computing system. That way, the images received by the cloud-based portion of the computing system may have face depictions obfuscated and may have correlated graphical objects inserted so that the images could still be used effectively for face matching as described above. Alternatively, the local portion of the computing system may transmit the unedited images to the cloud-based portion of the computing system, and the cloud-based portion of the computing system may perform the face obfuscation and graphical object insertion before proceeding with further analysis.

In an alternative implementation, the computing system may not be distributed. For instance, the computing system may be situated at a single location, such as in a home or office, and may obtain reference and query images, perform the face obfuscation and graphical object insertion, and use the inserted graphical objects as basis to effectively perform face matching. Other arrangements may be possible as well.

Note also that the process of editing images by obfuscating faces and inserting correlated graphical objects could be useful for other purposes as well, even without the step of finding matches between graphical objects and thus effective matches between faces. For instance, such edited images could be used as a basis to detect the unique presence of each of various people depicted by the images, even without knowing who the people are and without determining that a person depicted by one image matches a person depicted by another image. One use for this could be to count the number of people present in a given situation, for purposes of crowd control and/or to determine how many people are consuming media (e.g., for purposes of setting advertising rates), among other possibilities.

These and/or other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
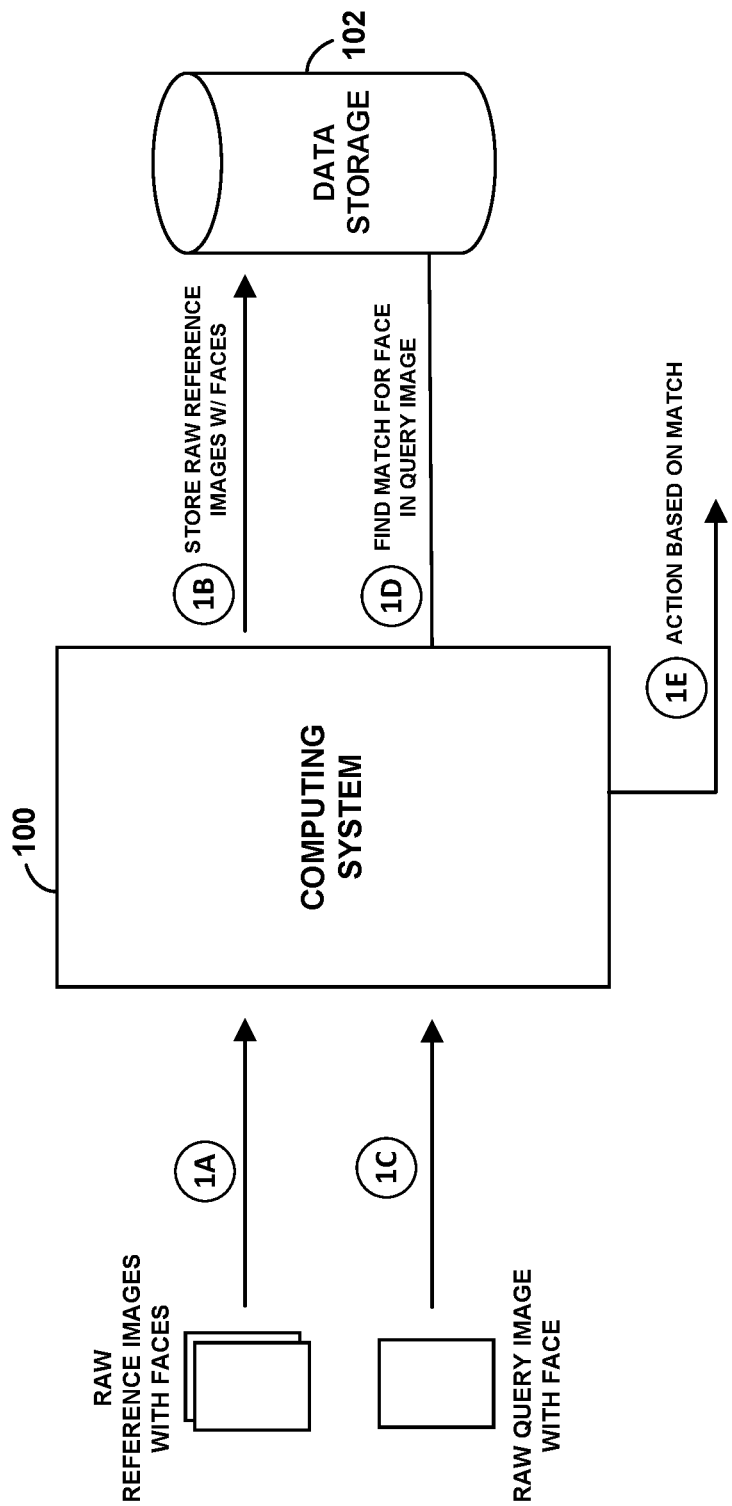
FIG. 1 is a simplified illustration of how images may be processed in an example implementation.

Referring to the drawings, FIG. 1 is a simplified illustration of how images may be received by a computing system and stored and used by the computing system as a basis to determine that a face depicted by a query image matches a face depicted by a reference image, possibly as a basis for taking associated action such as user-specific action for instance.

It should be understood that this and other arrangements and processes described herein could take various other forms. For instance, elements and operations could be re-ordered, distributed, replicated, combined, omitted, added, replaced, or otherwise modified. In addition, elements described as functional entities could be implemented as discrete or distributed components or in conjunction with other components/modules, and in any suitable combination and location. Further, various operations described as being carried out by one or more entities could be implemented by and/or on behalf of those entities, through hardware, firmware, and/or software, such as by one or more processing units or other processors executing program instructions stored in memory or other data storage, among other possibilities.

FIG. 1 illustrates an example computing system 100 including or having access to data storage 102 in which the computing system 100 may store images. This computing system 100, which may or may not be distributed as noted above, may include at least one processor (e.g., one or more general purpose processors and/or dedicated processors) (not shown) as well as non-transitory data storage (e.g., one or more volatile and/or non-volatile storage components such as magnetic, optical, flash, ROM, RAM, EPROM, EEPROM, etc. (not shown), possibly separate from data storage 102) that stores program instructions executable by the at least one processor to carry out various computing-system operations described herein.

FIG. 1 shows a series of steps that the example computing system 100 may carry out to receive, store, and analyze images in a representative process that does not involve the present obfuscation and graphical-object insertion.

As shown in FIG. 1, at step 1A, the computing system 100 receives one or more raw reference images each depicting a face of a human being, such as by depicting an image of a person including the person's face. Each of these images may depict a different person's face. Further, these images are raw images, as they have not been edited to obfuscate a depicted face and to insert a graphical object (possibly as the obfuscation) correlated with the depicted face.

In an example implementation, the computing system 100 may receive these images from another computing system and/or from one or more cameras (not shown) that capture the images, and the images may be unitary still images and/or frames of video, with the images being represented by data such as image or video files or streams, among other possibilities. Further, the computing system 100 may receive these images in connection with a provisioning process that operates to provision the computing system 100 with an indication of an action, permission, and/or other information associated respectively with one or more such depicted people. For instance, the computing system 100 may receive these images along with indications that the depicted people are authorized to access particular secure systems and/or indications of particular device/system settings (e.g., light levels, audio levels, etc.) that are associated with the depicted people, among other possibilities.

At step 1B, the computing system 100 then stores these raw reference images in the data storage 102. For instance, as the computing system 100 receives each raw reference image possibly in connection with associated provisioning data, the computing system 100 may store the raw reference image along with that provisioning data in the data storage 102 (e.g., with a database relationship between the reference image and the provisioning data) for later reference.

At step 1C, perhaps sometime later, the computing system 100 then receives a raw query image that depicts a given person's face. This image is raw as well, as it also has not been edited to obfuscate the depicted face and to insert a graphical object (possibly as the obfuscation) correlated with the depicted face. Further, the computing system 100 may likewise receive this image from another computing system and/or from a camera (not shown) that captures the image, and the image may be a still image and/or a video frame.

In an example implementation, the computing system 100 may receive this query image as part of a process to determine what action to take in relation to the person whose face is depicted by the query image. For instance, if the person is attempting to access a secure system, a camera may capture an image of the person's face and that image may be sent as the raw query image to the computing system 100 to facilitate determining if the face depicted by the query image matches a reference face image of a person authorized to access the secure system and thus to facilitate associated control over that access. As another example, if the person has entered a room and at issue is what light and/or audio control should occur in the room given the presence of that person, a camera may capture an image of the person's face and that image may be sent as the raw query image to the computing system 100 to facilitate a determination of what light and/or audio settings are associated with the person and to facilitate associated light and/or audio control.

At step 1D, the computing system 100 may then engage in face matching in an effort to find a reference image that depicts a face matching the face depicted by the query image. Here, for instance, the computing system 100 may use face vectors as discussed above, such as comparing a vector representing features of the face depicted by the query image with vectors of respectively representing features of the faces depicted by the reference images.

At step 1E, if the computing system 100 thereby finds through this or another matching process that the face depicted by the query image matches a face depicted by a given reference image, the computing system 100 may then take an associated action. For instance, if the computing system 100 thereby finds such a match, the computing system 100 may determine by reference to the associated provisioning data that the depicted face is the face of a person authorized to access a given secure system, and the computing system 100 may responsively allow such access, possibly by sending an unlock or other control signal to a system lock or the like. Or if the computing system 100 thereby finds such a match, the computing system 100 may determine by reference to the associated provisioning data that the depicted face is the face of a person associated with having particular lighting and/or audio turned on, and the computing system 100 may responsively turn on that lighting and/or audio, possibly by sending one or more control signals to an associated lighting and/or audio system. Other examples are possible as well.

As noted above, an issue with this system and process may be that the raw images stored in the data storage 102 might fall into the wrong hands, and the faces depicted by those images may be used for undesired purposes. By editing the images to obfuscate the depicted faces and insert corresponding graphical objects possibly as the obfuscation, the computing system 100 could help to reduce or minimize the risk that that would happen.

Figure 2:
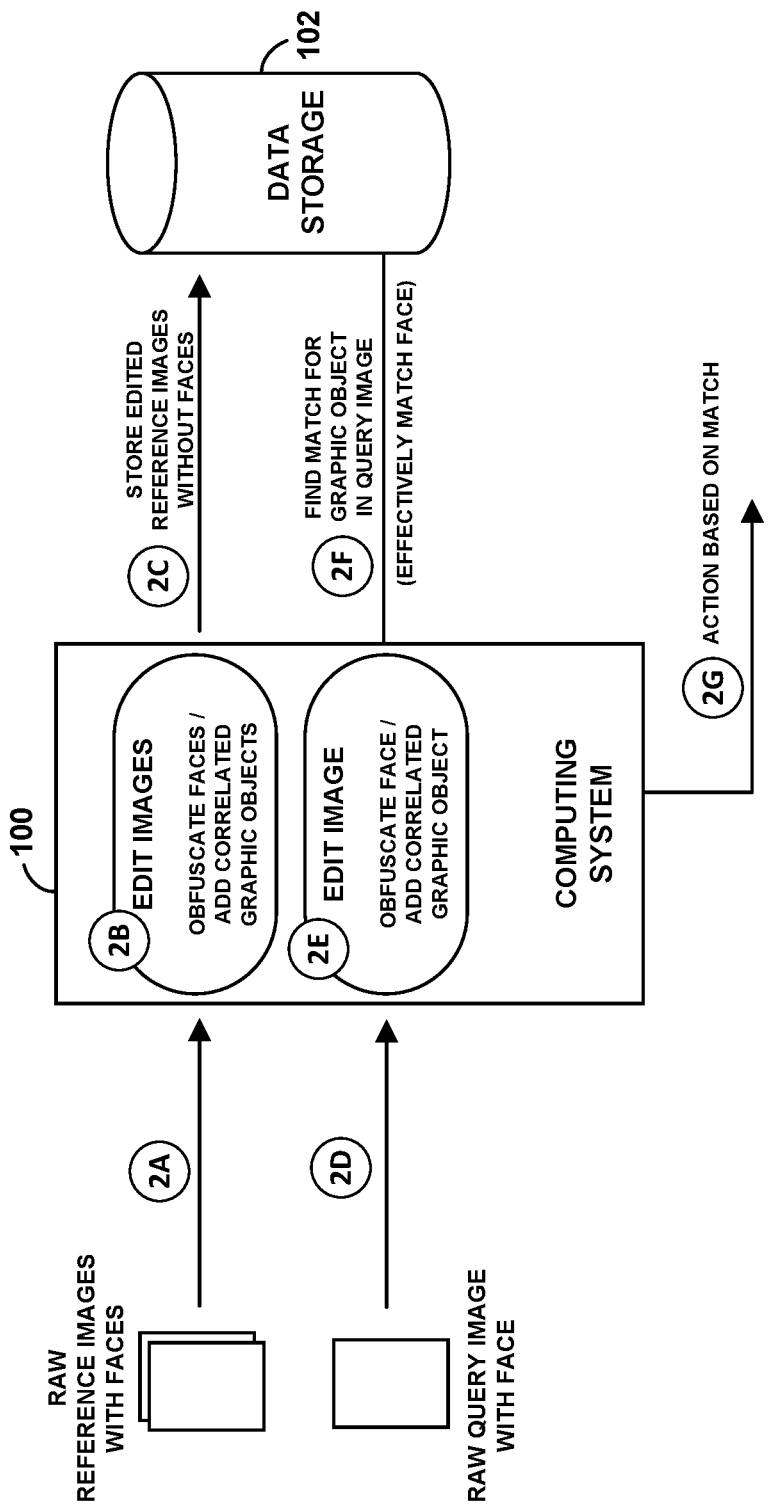
FIG. 2 is another simplified illustration of how images may be processed in an example implementation.

FIG. 2 is a variation of FIG. 1, showing how the computing system 100 could carry out this process in an example implementation. Namely, FIG. 2 shows a series of steps that the example computing system 100 may carry out to receive, store, and analyze images in a representative process that involves an example of the present obfuscation and graphical-object insertion.

As shown in FIG. 2, at step 2A, the computing system 100 receives one or more raw reference images each depicting a face of a human being, in much the same way as discussed above, possibly in association with a provisioning process as discussed above.

At step 2B, the computing system 100 then edits these reference images, perhaps editing each image as the computing system 100 receives the image and thus before the computing system 100 stores the image in the data storage 102, and/or at another time. The editing of each image could involve the above-described process. Namely, the computing system 100 could edit the image in a manner that obfuscates the face depicted by the image and inserts in the image a graphical object correlated with the face, possibly inserting the graphical object as the obfuscation of the face such as overlaying and thus blocking the face in the image.

To facilitate this, the computing system 100 could first detect a face in the image, using any known face-detecting algorithm, thereby establishing where the face is positioned within the image. The computing system 100 could then apply a vectorization process as described above to produce a face vector corresponding to the detected face, and the computing system 100 could establish a graphical object (e.g., a QR code) corresponding with the established face vector and/or otherwise corresponding with the detected face. Further, the computing system 100 could obfuscate the detected face and insert the established graphical object into the image in correlation with the detected face, possibly positioning the graphical object in a manner that covers or otherwise obfuscates the detected face, among other possibilities.

At step 2C, the computing system 100 then stores these edited reference images in the data storage 102, perhaps instead of storing the raw reference images in the data storage 102. For instance, as the computing system 100 edits each raw reference image possibly in connection with associated provisioning data, the computing system 100 may store the edited reference image along with that provisioning data in the data storage 102 for later reference.

At step 2D, perhaps sometime later, the computing system 100 then receives a raw query image that depicts a given person's face, in much the same way as discussed above.

At step 2E, the computing system 100 then edits the received raw query image in much the same way as discussed above. Namely, the computing system 100 could edit the image in a manner that obfuscates the face depicted by the image and inserts in the image a graphical object correlated with the face, possibly inserting the graphical object as the obfuscation of the face such as overlaying and thus blocking the face in the image.

At step 2F, the computing system 100 may then engage in effective face matching by searching for an edited reference image that depicts a graphical object matching the graphical object in the edited query image. In particular, because each such image as edited would have its face depiction obfuscated but would have an inserted graphical object that correlates with its face depiction, the computing system 100 could find that the face that was depicted by the query image matches a face depicted by a given reference image by finding that the graphical object depicted by the edited query image matches the graphical object depicted by the edited reference image. If the graphical objects are QR codes (e.g., corresponding with the face vectors), for instance, the computing system 100 could read the QR code in the query image and search for a reference image that depicts that same QR code or a QR code that matches the QR code in the query image to a sufficient degree of certainty.

At step 2G, if the computing system 100 thereby finds through this or another matching process that the graphical object depicted by the query image matches the graphical object depicted by a given reference image and thus, effectively that the face that was depicted by the query image matches a face that was depicted by the given reference image, the computing system 100 may then take an associated action, in much the same way as discussed above for instance.

Figure 3:
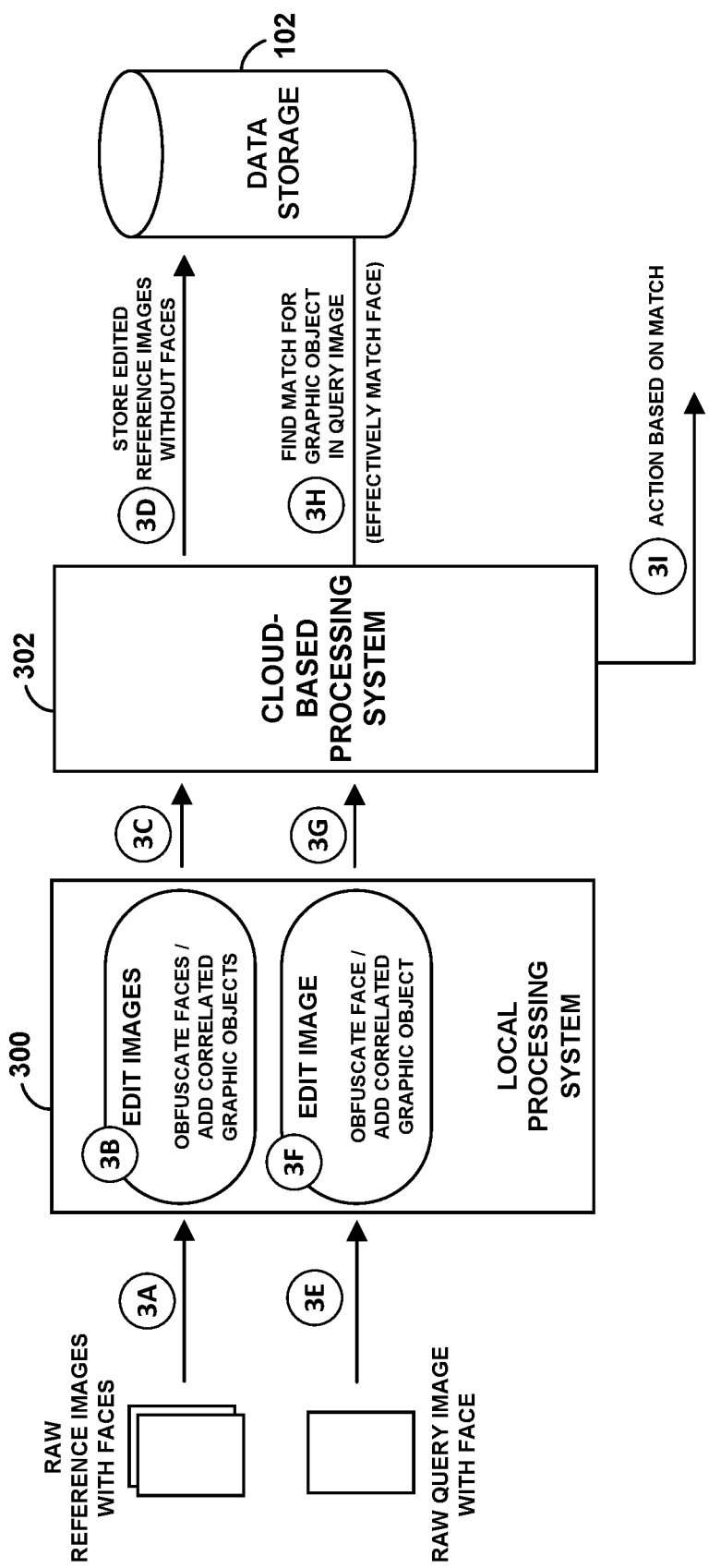
FIG. 3 is another simplified illustration of how images may be processed in an example implementation.

FIG. 3 is next a variation of FIG. 2, showing how this process may work if the computing system 100 is distributed, including a local processing system 300 and a cloud-based processing system 302, and where the editing of the reference images and query image is done at the local processing system 300 before providing the images to the cloud-based processing system 302 for storage and analysis. An example of this scenario may be where the local processing system 300 is at a customer premises such as a home or office and/or in a user's mobile phone, among other possibilities, and where the cloud-based processing system 302 is in a network server platform accessible through the internet or other network. The process could usefully apply in that scenario to help reduce the extent to which the cloud-based processing system 302 would receive and store raw images that depict people's faces.

As shown in FIG. 3, at step 3A, the local processing system 300 receives one or more raw reference images each depicting a face of a human being, in much the same way as discussed above, possibly in association with a provisioning process as discussed above.

At step 3B, the local processing system 300 then edits these reference images, perhaps editing each image as the local processing system 300 receives the image. This editing of each image could involve the above-described process as well. Namely, the local processing system 300 could edit the image in a manner that obfuscates the face depicted by the image and inserts in the image a graphical object correlated with the face, possibly inserting the graphical object as the obfuscation of the face such as overlaying and thus blocking the face in the image.

At step 3C, the local processing system 300 transmits the edited reference images, along with any associated provisioning data, to the cloud-based processing system 302. For instance, the local processing system 300 may transmit each edited reference image to the cloud-based processing system 302 after editing the image. And at step 3D, the cloud-based processing system 302 then stores these edited reference image in the data storage 102, possibly in connection with associated provisioning data, for later reference.

At step 3E, perhaps sometime later, the local processing system 300 then receives a raw query image that depicts a given person's face, in much the same way as discussed above. And at step 3F, the local processing system 300 edits this raw query image in much the same way as discussed above. Namely, the local processing system 300 could edit the image in a manner that obfuscates the face depicted by the image and inserts in the image a graphical object correlated with the face, possibly inserting the graphical object as the obfuscation of the face such as overlaying and thus blocking the face in the image.

At step 3G, the local processing system 300 then transmits the edited query image to the cloud-based processing system 302. And at step 3H, the cloud-based processing system 302 may then engage in effective face matching by searching for an edited reference image that depicts a graphical object matching the graphical object in the edited query image, in much the same way as discussed above.

At step 3I, if the cloud-based processing system 302 thereby finds through this or another matching process that the graphical object depicted by the query image matches the graphical object depicted by a given reference image and thus, effectively that the face that was depicted by the query image matches a face that was depicted by the given reference image, the cloud-based processing system 302 may then take an associated action, in much the same way as discussed above for instance.

Figure 4:
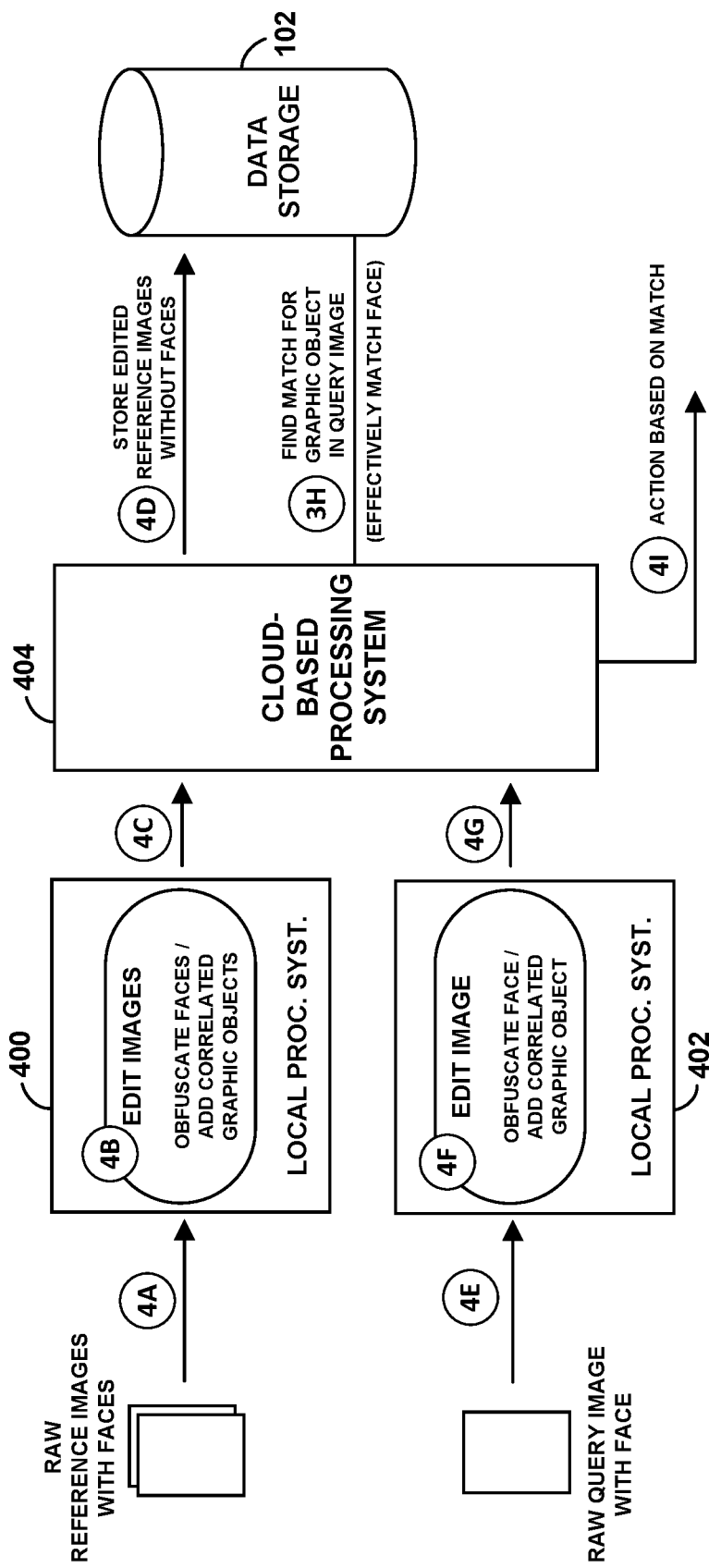
FIG. 4 is another simplified illustration of how images may be processed in an example implementation.

FIG. 4 is a variation of FIG. 3, showing how this process may work if the computing system 100 is distributed, including a multiple local processing system 400, 402 and a cloud-based processing system 404, and where the editing of the reference images and query image is done at the local processing systems 400, 402 before providing the images to the cloud-based processing system 302 for storage and analysis. An example of this scenario may be where local processing system 400 is one computing device used for purposes of provisioning the cloud-based processing system 404 with reference images, and where local processing system 402 is a different computing device used for purposes of providing a query image to facilitate effective face matching and associated action by the cloud-based processing system 406.

As shown in FIG. 4, at step 4A, the local processing system 400 receives one or more raw reference images each depicting a face of a human being, in much the same way as discussed above, possibly in association with a provisioning process. At step 4B, the local processing system 400 edits these reference images as discussed above, obfuscating faces and inserting corresponding graphical objects possibly as the obfuscations. At step 4C, the local processing system 400 transmits the edited reference images to the cloud-based processing system 406, possibly with associated provisioning data. And at step 4D, the cloud-based computing system stores the edited reference images in data storage 102, possibly with associated provisioning data, for later reference.

At step 4E, perhaps sometime later, the other local processing system 402 then receives a raw query image that depicts a given person's face, in much the same way as discussed above. At step 4F, the local processing system 402 edits this raw query image in much the same way as discussed above, obfuscating the face and inserting a corresponding graphical object possibly as the obfuscation. At step 4G, the local processing system 402 then transmits the edited query image to the cloud-based processing system 404.

At step 4H, the cloud-based processing system 404 may then engage in effective face matching by searching for an edited reference image that depicts a graphical object matching the graphical object in the edited query image, in much the same way as discussed above. And at step 4I, if the cloud-based processing system 404 thereby finds through this or another matching process that the graphical object depicted by the query image matches the graphical object depicted by a given reference image and thus, effectively that the face that was depicted by the query image matches a face that was depicted by the given reference image, the cloud-based processing system 404 may then take an associated action, in much the same way as discussed above for instance.

As noted above, the graphical image that the computing system so establishes and inserts into a given image in a manner that obfuscates a face detected in the image could be considered to be "obfuscation marker." The obfuscation marker could obfuscate the detected face in a manner that prevents a person who may observe the resulting, modified image from identifying the human face based merely on that observation, but that also includes predefined symbology that could be interpretable by a machine to identify the obfuscated human face.

Various examples of such obfuscation markers could be possible.

For instance, the obfuscation marker could be a QR code or other matrix barcode or the like that encodes data representing the face vector or other identification of the detected face and/or that encodes data that stored mapping data would correlate to the face vector or to other identification of the detected face. That way, a computing system could programmatically read the barcode to extract the associated data and could use the extracted data to determine the identity of the face. Further or alternatively, a computing system could so extract data from obfuscation markers in two or more such images and could compare the extracted data to determine whether the obfuscated face in one image matches the obfuscated face in another image, such as to determine whether the obfuscated face in a query image matches the obfuscated face in a reference image.

Alternatively, the obfuscation marker could be a different form of barcode, such as a one-dimensional bar code, and a computing system could use it in a similar manner. Still alternatively, the obfuscation marker could be a replacement face, possibly a machine-generated face, which mapping data may similarly correlate with an identity of the originally depicted face, so that a computing system could determine the identity of the originally depicted face by identifying the replacement face and, by reference to the mapping data, correlating the replacement face identity to the identity of the originally depicted face.

Still alternatively, the obfuscation marker could be a pixel cloud, which may steganographically encode an identify the underlying face. For instance, a computing system may blur the face image beyond recognition but the pixels that representing the blurred face could themselves steganographically encode an identity of the originally depicted face, so that the computing system or another computing system could then later extract that identity, to facilitate taking action.

Figure 5:
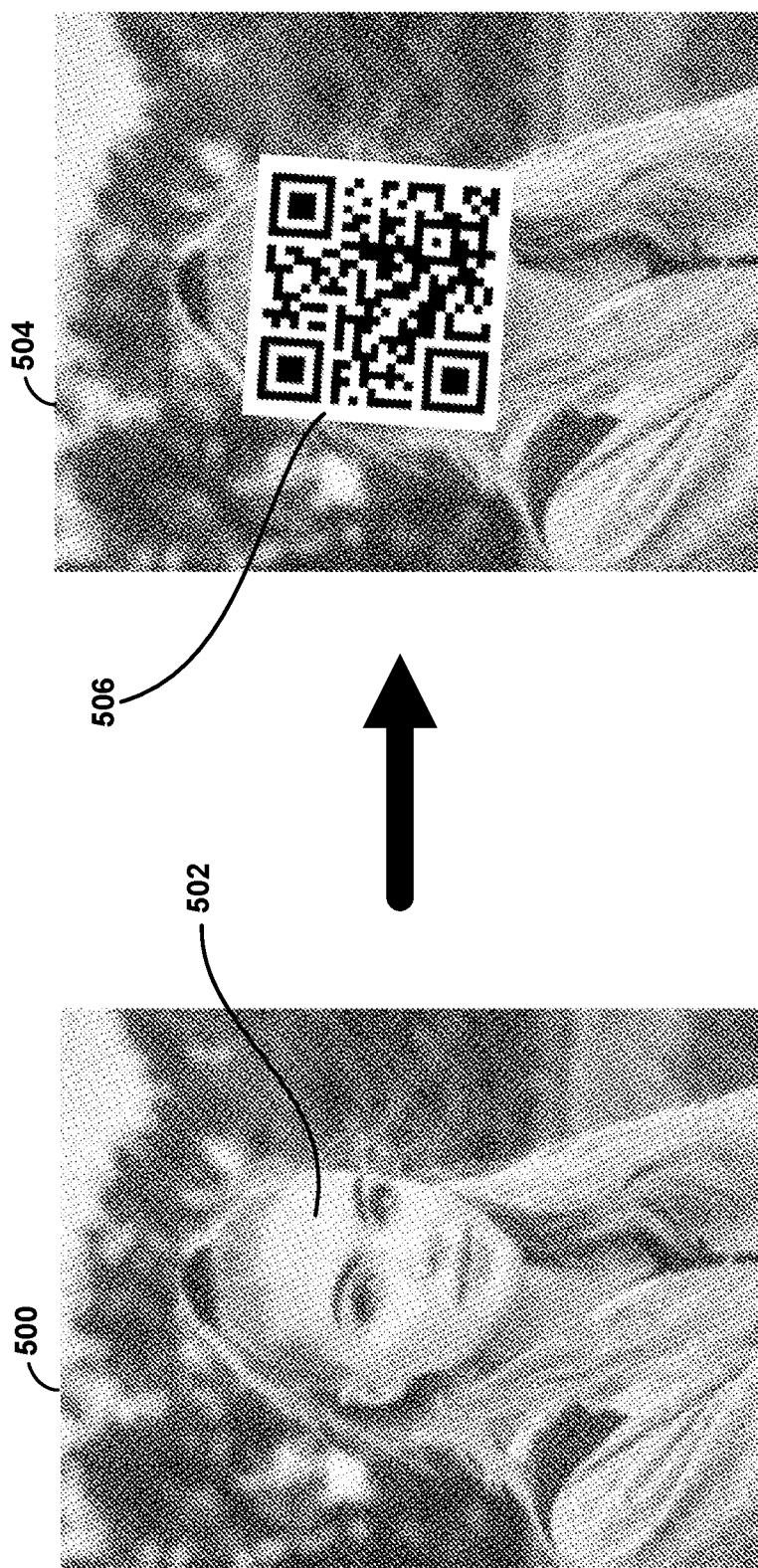
FIG. 5 is an illustration of how a QR code corresponding with a depicted face could be superimposed over the depicted face in order to obfuscate the depicted face.

FIG. 5 illustrates an example of how an image may be edited in a manner that obfuscates a face depicted by the image and inserts into the image a graphical object correlated with the depicted face, with the graphical object being a QR code correlated with the face. Namely, FIG. 5 shows an example raw image 500 that depicts a person having a face 502, and the figure then shows that example raw image 500 being transformed into an edited image 504 that includes a QR code 506 overlaid in a manner that blocks and thus obfuscates the face 502. In line with the discussion above, the computing system 100 may establish this QR code based on a face vector representing features of the face 502, among other possibilities, and the computing system 100 may insert this QR code into the image at a position designed to obfuscate the face 502.

As shown in FIG. 5, the QR code may be overlaid as a rectangular object in a manner that obfuscates the face but in a position and with a size designed to obfuscate the face. In another implementation, the QR code or another such graphical object may be warped to approximate the shape of the depicted face. Optimally, for a QR code for example, the warping would be limited to an extent that would still facilitate machine-reading of the QR code and thus extracting of encoded data. For instance, the warping would be limited to still allow a timing pattern within the QR code to establish the orientation of elements of the QR code, to facilitate decoding.

Figure 6:
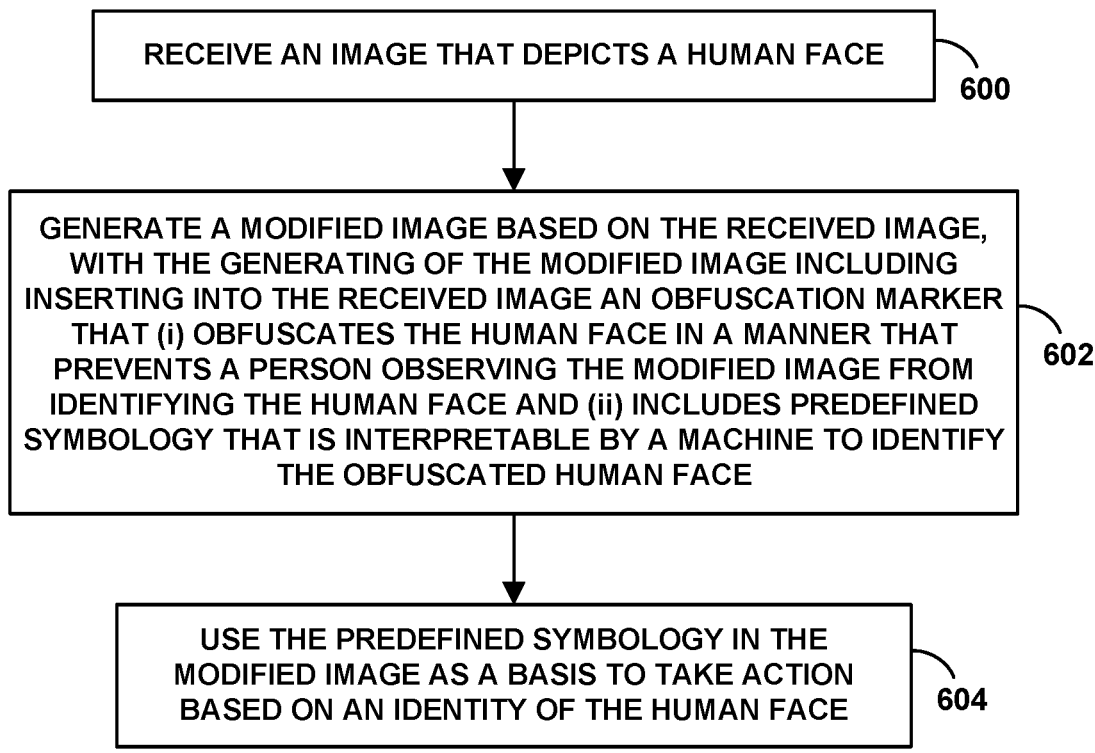
FIG. 6 is a flow chart illustrating a method that could be carried out in accordance with the disclosure.

FIG. 6 is a flow chart illustrating an example method that could be carried out in accordance with the present disclosure, making use of obfuscation coding in an image. As shown in FIG. 6, at block 600, a computing system could receive an image that depicts a human face. At block 602, the computing system could then generate a modified image based on the received image, with the generating of the modified image including inserting into the received image an obfuscation marker that (i) obfuscates the human face in a manner that prevents a person observing the modified image from identifying the human face and (ii) includes predefined symbology that is interpretable by a machine to identify the obfuscated human face. And at block 604, the computing system (or another computing system) could then use the predefined symbology in the modified image as a basis to take action based on an identity of the human face.

In line with the discussion above, this method could additionally involve the computing system storing the modified image and later retrieving the stored modified image to facilitate the using the predefined symbology as a basis to take the action based on the identity of the human face. Alternatively, the computing system may so store the modified image, and another computing system may later retrieve the stored modified image to facilitate taking such action.

As discussed above, the obfuscation marker in this method could be inserted into the image in a manner that replaces or blocks view of the depicted human face, so that a person observing the modified image would not be able to identify the human face, e.g., not being able see the face and therefore not being able to determine from the face whose face it is. However, the predefined symbology of the obfuscation marker could be interpretable by a machine such as a processor to identify the obfuscated human face, e.g., by extracting or determining from the symbology a face vector as a representation of the face and/or by determining whose face it is.

As further noted above, the obfuscation marker could take various forms.

For instance, the obfuscation marker could comprise a matrix bar code that encodes an identification of the human face. For instance the obfuscation marker could comprise a QR code. Alternatively or additionally, the obfuscation marker could comprise an image of another face that is not a face of the same human as the face depicted in the received image, and mapping data could correlate the other face with an identification of the human face. For instance, the obfuscation marker could comprise another human face, or possibly an animal face. Still alternatively or additionally, the obfuscation marker could comprise a pixelated cloud that is steganographically encoded with an identification of the human face.

As further discussed above, the action that may be carried out based on an identity of the human face ascertained from the predefined symbology in the modified image could take various forms. For instance, the action could comprise determining that a person having the depicted human face is authorized to gain access to a secure system. Further or alternatively, the action could involve matching an obfuscated face in one modified image with an obfuscated face in another modified image, among other possibilities.

Figure 7:
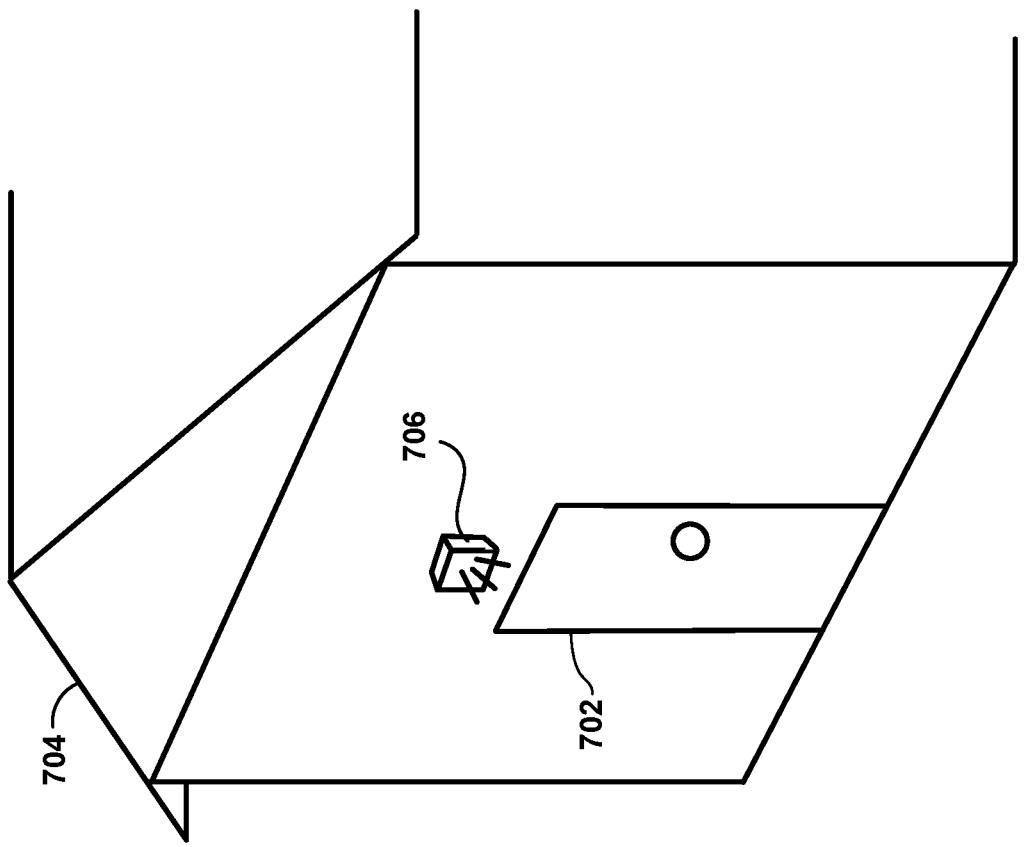
FIG. 7 is an illustration of a scenario in which disclosed principles could apply to facilitate taking action.
Figure 8:
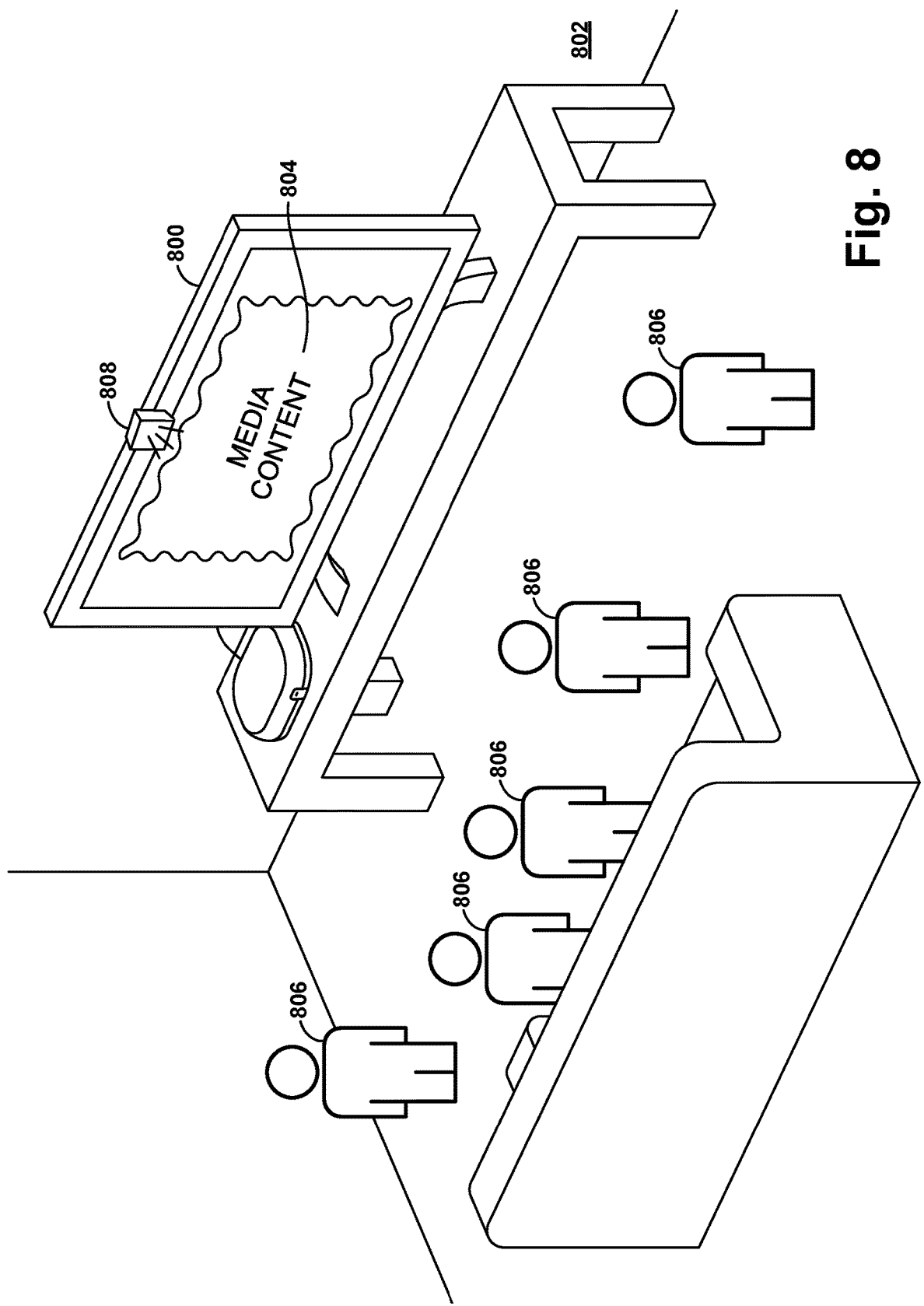
FIG. 8 is an illustration of another scenario in which disclosed principles could apply to facilitate taking action.

FIGS. 7 and 8 illustrate example scenarios in connection with which the above-discussed process could be applied to facilitate carrying out action in line with the discussion above.

FIG. 7 illustrates an example scenario in which the present process could help to facilitate control over access to a secure system. Namely, FIG. 7 illustrates a scenario where a person 700 is present at the door 702 of a house 704 and seeks entry into the house 704.

In the arrangement of FIG. 7, a camera 706 positioned near the door 702 may capture a query image of the person 700, depicting a face of the person. In line with the discussion above, the computing system 100 may then edit this captured query image in a manner that obfuscates the depicted face and inserts a graphical object correlated with the depicted face, possibly as the obfuscation. The computing system 100 may then search for a reference image having a matching graphical object, as an effective face matching process. Upon finding a reference image that has a matching graphical object, the computing system 100 may thereby determine that the face that was depicted by the query image matches the face that was depicted by the reference image. The computing system 100 may then determine from associated provisioning data that the person having the matching face, i.e., the person 700 at the door 702, is authorized to enter the house 704. Therefore, the computing system 100 may send a signal to an electronic door lock or an associated system to unlock the door 702 and grant the person 700 entry into the house 704.

Note that a similar process could be carried out in line with the discussion above to control lighting, audio, or other device/system settings. For instance, when a person such as person 700 walks into a home, room, or other area, a camera could likewise capture an query image of the person, depicting a face of the person, and the computing system 100 could likewise edit the query image to obfuscate the face and insert a graphical object correlated with the face, possibly as the obfuscation. Further, the computing system 100 may then likewise compare graphical objects as a basis to find a matching reference image. Based on provisioning data, the computing system 100 may determine that particular lighting and/or audio settings should be applied in the person's environment, and the computing system 100 may send a control signal to cause the determined lighting and/or audio settings to be applied.

FIG. 8 next illustrates an example scenario in which the present process could help to facilitate counting of unique consumers of media content, for ratings purposes (e.g., for setting of advertising rates) or other purposes. Namely, FIG. 8 shows a scenario where a television 800 in a room 802 is presenting media content 804 such as a television program or movie for instance, and where multiple people 806 are present in front of the television 800 and are thus consuming the media content 804.

In the arrangement of FIG. 8, a camera 808 positioned in the room 802 may capture an image of the people 806 who are present in the room 802 while the media content 804 is being presented. The computing system 100 may then edit this captured image in a manner that obfuscates each person's depicted face and inserts respectively for each person a graphical object correlated with the person's depicted face, possibly as the obfuscation of the person's depicted face. Further, computing system 100 may evaluate the edited image to determine how many separate unique graphical objects are present in the image, as an indication of how many unique consumers of the media content were present at the time, possibly without determining who those people are. The computing system 100 may then use this count as a basis for content ratings, such as to establish statistics about the extent to which people consumed the media content, perhaps as a basis to set advertising rates, among other possibilities.

As further noted above, insertions of graphical objects other than QR codes or the like are possible as well. For instance, the computing system 100 may insert a graphical object as pixels or pixel variations in manner that defines a watermark correlated with the depicted face. Such image watermarking is well known and could take various forms. One example implementation for present purposes, as noted above, could involve obfuscating the depicted face by blurring the face beyond recognition, and watermarking into the pixels defining the blurred face a code that corresponds with the depicted face. With this implementation, the computing system 100 may then be able to determine effectively that the faces in two such images match each other by determining that the watermarks in the blurred faces in the two images match each other.

Even without obfuscating a depicted face, insertion of watermarks into images in association with people depicted in images may be useful. For instance, given video content such as a television program or movie, it may be useful for a computing system to include watermarks that identify the actors per video frame. Such watermarks may be manually provisioned. Alternatively, the computing system may use facial recognition as discussed above to recognize actor faces within individual video frames, and the computing system may then watermark the video frames to encode the actors' names or other identifiers as metadata, and/or may otherwise add frame-specific metadata that specifies actors' names or other identifiers on a per-frame and/or per-scene basis.

Such watermarking and/or other added metadata may conveniently enable a person watching the video content to obtain information about actors within given frames when desired. For instance, a streaming media player or other media presentation system presenting the video may allow a person watching then video to request information about actors in a currently presented scene and may respond to such a request by reading the watermarking and/or other metadata within or associated with a currently presented video frame to determine the actor names and by presenting to the person the determined actor names. Other arrangements are possible as well.

Figure 9:
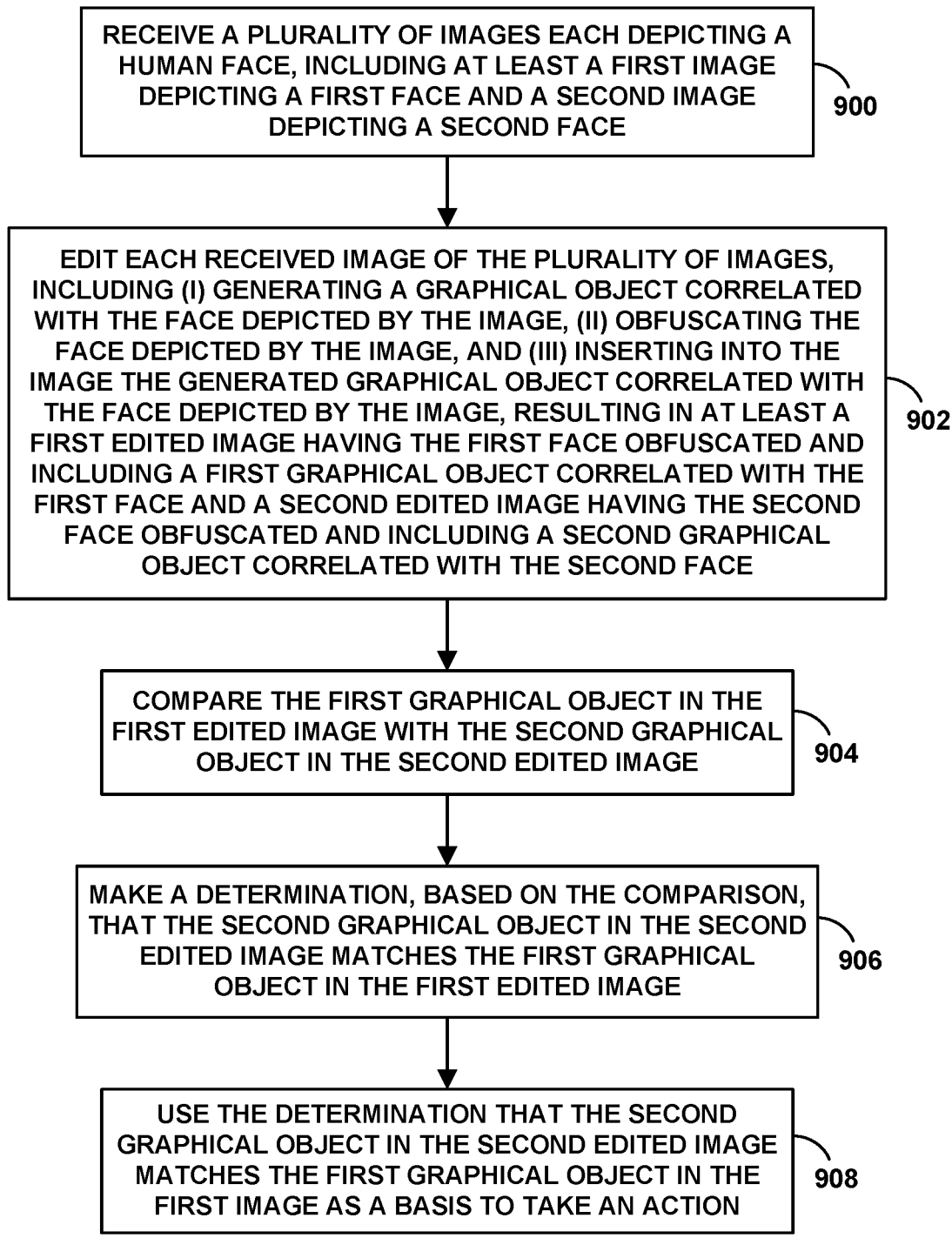
FIG. 9 is another flow chart illustrating an method that could be carried out in accordance with the disclosure.

FIG. 9 is next another flow chart illustrating a method that could be carried out in accordance with present disclosure. As shown in FIG. 9, at block 900, the method a computing system receiving a plurality of images each depicting a human face (e.g., each depicting a respective human face), including at least a first image depicting a first face and a second image depicting a second face. Further, at block 902, the method includes the computing system editing each received image of the plurality of images, including (i) generating a graphical object correlated with the face depicted by the image, (ii) obfuscating the face depicted by the image, and (iii) inserting into the image the generated graphical object correlated with the face depicted by the image. This editing may thus result in at least a first edited image having the first face obfuscated and including a first graphical object correlated with the first face and a second edited image having the second face obfuscated and including a second graphical object correlated with the second face.

At block 904, the method then includes the computing system comparing the first graphical object in the first edited image with the second graphical object in the second edited image. And at block 906, the method includes the computing system making a determination, based on the comparison, that the second graphical object in the second edited image matches the first graphical object in the first edited image. At block 908, the method then includes using the determination that the second graphical object in the second edited image matches the first graphical object in the first image as a basis to take an action.

Note that the receiving of the images in this process could involve receiving the images at various different times and could involve the images being provided by a separate entity or receiving the images internally into a processor, among other possibilities. Likewise, the editing of the images could be done at various different times as well.

In line with the discussion above, the act of obfuscating the face depicted by the image and inserting into the image the generated graphical object correlated with the face depicted by the image could involve inserting the generated graphical object into the image in a manner that obfuscates the face depicted by the image.

Further, as discussed above, the graphical object correlated with the face depicted by the image could comprise a two-dimensional bar code corresponding with the face depicted by the image. For instance, the two-dimensional bar code could be a QR code. Further, the two-dimensional bar code could encode data representing features of the face depicted by the image.

As additionally discussed above, the computing system could be the entity that takes the action. Further, the action could take various forms, such as (i) providing access to a secure system, (ii) engaging in user-specific control of a device or system, and (iii) counting consumption of media content, among other possibilities.

Figure 10:
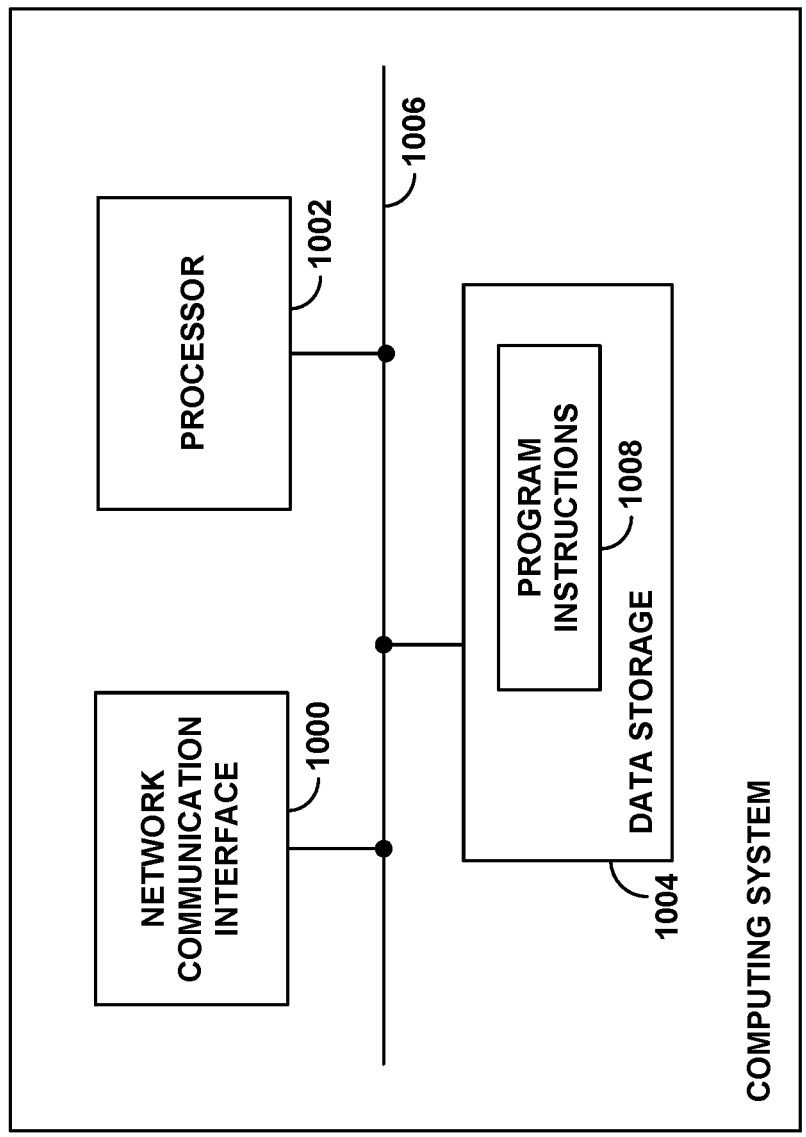
FIG. 10 is simplified block diagram of an example computing system that could operate in accordance with the disclosure.

FIG. 10 is next a simplified block diagram of a computing system that could be configured to operate according to the present disclosure. This block diagram may represent the computing system 100 and/or portions of thereof such as the local processing system 300 or the cloud-based processing system 302, among other possibilities.

As shown in FIG. 10, the example computing system includes at least one network communication interface 1000, at least one processor 1002, and at least one non-transitory data storage 1004, any or all of which could be integrated together or, as shown, communicatively linked together by a system bus, network, or other connection mechanism 1006.

The at least one network communication interface 1000 could comprise a physical communication interface and associated logic, enabling the computing system to engage in network communication with one or more other entities. For instance, the at least one network communication interface 1000 could comprise a wireless or wired Ethernet interface or other type of network interface, for engaging in IP communication and/or other type of network communication.

The at least one processor 1002 could comprise one or more general purpose processors (e.g., microprocessors) and/or one or more specialized processors (e.g., application specific integrated circuits). And the at least one non-transitory data storage 1004 could comprise one or more volatile and/or non-volatile storage components, such as optical, flash, magnetic, RAM, ROM, EPROM, EEPROM, or other storage, possibly integrated in whole or in part with the at least one processor 1002. Further, as shown, the data storage 1004 could store program instructions 1008, which could be executable by the processor 1002 to carry out (e.g., cause the computing system to carry out) various operations described herein.

Various features described herein could be implemented in this context as well, and vice versa.

Further, the present disclosure also contemplates one or more non-transitory computer-readable media encoded with, storing, or otherwise embodying program instructions executable by at least one processor of a computing system to cause the computing system to carry out various operations as described herein.

Exemplary embodiments have been described above. Those skilled in the art will understand, however, that changes and modifications may be made to these embodiments without departing from the true scope and spirit of the invention.

What is claimed is:

1. A method comprising:
receiving into a computing system an image that depicts a human face;
generating by the computing system a modified image based on the received image, wherein generating the modified image includes inserting into the received image an obfuscation marker that (i) obfuscates the human face in a manner that prevents a person observing the modified image from identifying the human face and (ii) includes predefined symbology that is interpretable by a machine to identify the obfuscated human face; and
using by the computing system the predefined symbology in the modified image as a basis to take action based on an identity of the human face.

2. The method of claim 1, further comprising storing, by the computing system, the modified image, and later retrieving by the computing system the stored modified image to facilitate the using by the computing system of the predefined symbology as a basis to take the action based on the identity of the human face.

3. The method of claim 1, wherein the obfuscation marker comprises a matrix bar code that encodes an identification of the human face.

4. The method of claim 3, wherein the matrix bar code comprises a quick response (QR) code.

5. The method of claim 1, wherein the obfuscation marker comprises an image of another face that is not a face of the same human as the face depicted in the received image, wherein mapping data correlates the other face with an identification of the human face.

6. The method of claim 1, wherein the obfuscation marker comprises a pixelated cloud steganographically encoded with an identification of the human face.

7. The method of claim 1, wherein the action comprises determining that a person having the depicted human face is authorized to gain access to a secure system.

8. A computing system comprising:
at least one processor;
at least one non-transitory data storage; and
program instructions stored in the at least one non-transitory data storage and executable by the at least one processor to carry out operations including:
receiving an image that depicts a human face,
generating a modified image based on the received image, wherein generating the modified image includes inserting into the received image an obfuscation marker that (i) obfuscates the human face in a manner that prevents a person observing the modified image from identifying the human face and (ii)

includes predefined symbology that is interpretable by a machine to identify the obfuscated human face, and using the predefined symbology in the modified image as a basis to take action based on an identity of the human face.

9. The computing system of claim 8, wherein the operations additionally include storing the modified image, and later retrieving the stored modified image to facilitate the using of the predefined symbology as a basis to take the action based on the identity of the human face.

10. The computing system of claim 8, wherein the obfuscation marker comprises a matrix bar code that encodes an identification of the human face.

11. The computing system of claim 10, wherein the matrix bar code comprises a quick response (QR) code.

12. The computing system of claim 8, wherein the obfuscation marker comprises an image of another face that is not a face of the same human as the face depicted in the received image, wherein mapping data correlates the other face with an identification of the human face.

13. The computing system of claim 8, wherein the obfuscation marker comprises a pixelated cloud steganographically encoded with an identification of the human face.

14. The computing system of claim 8, wherein the action comprises determining that a person having the depicted human face is authorized to gain access to a secure system.

15. At least one non-transitory computer-readable medium having stored thereon instructions executable by at least one processor to carry out operations comprising:

receiving an image that depicts a human face, generating a modified image based on the received image, wherein generating the modified image includes inserting into the received image an obfuscation marker that (i) obfuscates the human face in a manner that prevents a person observing the modified image from identifying the human face and (ii) includes predefined symbology that is interpretable by a machine to identify the obfuscated human face, and using the predefined symbology in the modified image as a basis to take action based on an identity of the human face.

16. The at least one non-transitory computer-readable medium of claim 15, wherein the operations additionally include storing the modified image, and later retrieving the stored modified image to facilitate the using of the predefined symbology as a basis to take the action based on the identity of the human face.

17. The at least one non-transitory computer-readable medium of claim 15, wherein the obfuscation marker comprises a matrix bar code that encodes an identification of the human face.

18. The at least one non-transitory computer-readable medium of claim 17, wherein the matrix bar code comprises a quick response (QR) code.

19. The at least one non-transitory computer-readable medium of claim 15, wherein the obfuscation marker comprises an image of another face that is not a face of the same human as the face depicted in the received image, wherein mapping data correlates the other face with an identification of the human face.

20. The at least one non-transitory computer-readable medium of claim 15, wherein the obfuscation marker comprises a pixelated cloud steganographically encoded with an identification of the human face.

\* \* \* \* \*